United States Patent Office 3,419,518
Patented Dec. 31, 1968

3,419,518
SELF-EXTINGUISHING MOLDING MATERIAL BASED ON PROPYLENE POLYMERS
Dieter Mahling, Heinz Mueller-Tamm, and Hubertus Seibt, Ludwigshafen (Rhine), Ludwig Zuern, Mannheim, and Emil Scharf, Ludwigshafen (Rhine), Germany, assignors to Badische Anilin- & Soda-Fabrik Aktiengesellschaft, Ludwigshafen (Rhine), Germany
No Drawing. Filed May 31, 1963, Ser. No. 284,320
Claims priority, application Germany, June 8, 1962, B 67,609
4 Claims. (Cl. 260—41)

This invention relates to a self-extinguishing molding material based on propylene polymers which contains antimony trioxide and an organic bromine compound.

Propylene polymers, particularly polypropylene, are gaining increasing importance as raw materials for the manufacture of sheets, fibers, hollow articles and other molded objects. Their ready flammability is, however, a disadvantage in their application, particularly to some fields of electrical engineering and civil engineering and also in mining and shipbuilding.

It is known that molding material based on propylene polymers and antimony trioxide which contains chlorinated paraffins, substituted 2,4,6-tribromoanilines or phenols or phenol ethers substituted on the benzene nucleus with bromine atoms is self-extinguishing. In these prior art molding materials, however, the total amount of antimony trioxide and halogen compound must as a rule be relatively large if the self-extinguishing properties are to satisfy the requirements in practice. The amounts required for this purpose are usually more than 15% by weight. When such large amounts of flame-retardant substances of the said type are added, however, a molding material is obtained whose mechanical and electrical properties are considerably deteriorated. Moreover, such molding material often has other disadvantages. For example molding material containing chloroparaffins often has a tacky surface which favors contamination, and molding material which contains phenols substituted on the benzene nucleus with bromine atoms has an unpleasant odor.

It is an object of this invention to provide molding material based on propylene polymers, particularly based on polypropylene, which contain particularly small amounts of flame-retardant additives. Another object of the invention is to provide molding material based on polypropylene which has no disagreeable odor.

We have found that molding material based on propylene polymers, antimony trioxide and organic bromine compounds, which contains, with reference to the weight of molding material, from 0.2 to 10% by weight of antimony trioxide and 1 to 13% by weight of an organic compound which contains 45 to 93% by weight (with reference to the weight of the organic compound) of bromine in aliphatic combination and which has a boiling point above 200° C., the amount of antimony trioxide and organic bromine compound together being from 2 to 15% by weight (with reference to the weight of the molding material) have particularly good self-extinguishing properties. The molding material preferably contains 1 to 5% by weight of antimony trioxide and 2 to 6% by weight of organic bromine compound, both percentages being with reference to the weight of the molding material.

Examples of organic compounds containing bromine in aliphatic combination are bromination products of linear, branched or cyclic aliphatic compounds such as hydrocarbons, carboxylic acids, carboxylic amides, carboxylic esters, nitriles, alcohols and amines, and also bromination products of araliphatic compounds bearing one or more bromine atoms on the aliphatic radical. Organic compounds which contain 70 to 80% by weight of aliphatically combined bromine and whose boiling point at atmospheric pressure is at least 200° C. are particularly suitable. Brominated hydrocarbons, brominated amides and brominated alcohols are preferred. Examples of these which are very suitable are linear and branched brominated alkanes having six to twelve carbon atoms, brominated araliphatic hydrocarbons having ten to twenty carbon atoms and one benzene nucleus free from bromine atoms, brominated cycloalkanes having six to twelve carbon atoms in their rings, brominated aliphatic amides of carboxylic acids containing two to five carbon atoms in the acid radical, and brominated aliphatic alcohols having three to six carbon atoms. Linear araliphatic hydrocarbons which contain sixteen carbon atoms, one benzene nucleus free from bromine atoms and six to eight aliphatically combined bromine atoms, especially phenylhexabromodecane and brominated cycloalkanes containing six to twelve carbon atoms in the rings and three to eight, preferably four to six, bromine atoms are particularly suitable, and also brominated alcohols derived from butene-2, particularly bromobutenediols which contain at least two bromine atoms and whose double linkage is in 2-position. Examples of particularly suitable bromine compounds are: 1,2,3,4-tetrabromocyclooctane, 1,2,5,6 - tetrabromocyclooctane, 1,2,5,6,9,10-hexabromocyclododecane, 1-phenyl-1,2,4,5,8,9-hexabromodecane, 1,2-dibromo-4-(α,β-dibromoethyl)-cyclohexane, N,N′,N″-tri-(α,β-dibromopropionyl)-trimethylene triamine and methylene-bis-(1,2-dibromo-1-methylpropionamide).

Homopolymers and copolymers of propylene having molecular weights (measured according to Überreiter, "Makromolekulare Chemie" 8 (1952), 21–28) of between about 100,000 and 2,000,000, are suitable propylene polymers. These polymers of propylene may be obtained by well-known and conventional methods, particularly using Ziegler catalysts. Molding material based on homopolymers of propylene, i.e. on polypropylene, is of particular interest because of its good properties. The production of polypropylene is described for example in U.S. patent specifications Nos. 3,051,690 and 3,050,471. Copolymers suitable for use in the molding material are those prepared in conventional manner from at least 70 mole percent of propylene and other ethylenically unsaturated polymerizable compounds such as ethylene, butene-1, vinyl acetate, vinyl propionate, styrene and also acrylic and methacrylic esters of aliphatic alcohols.

In addition to the flame-retardant additives according to this invention, the molding material may contain other prior art flame-retardant additives, stabilizing agents, lubricants, dyes, fillers, antistatic compounds and, in amounts up to 30% by weight with reference to the amount of polypropylene, other solid plastics which are miscible with polypropylene, such as polyisobutylene or polyethylene. Examples of such additives or stabilizing agents are: thioesters, such as dilauryl thiodipropionate, bisphenols, aromatic sulfides and disulfides, organic phosphites, benzophenone derivatives, thiazole derivatives, epoxides, stearates, salicylates, carbon black, and complex-forming substances, such as pentaerythritol and alkali salts of tartaric acid and of ethylene diamine tetracetic acid. Preferred additives are amounts of up to 50% by weight (with reference to the weight of compound containing aliphatically combined bromine) of chlorinated polyisobutylene and/or chlorinated paraffins having a chlorine content of 50 to 80% by weight (with reference to the weight of the chlorinated compound) and/or polynuclear aromatic compounds which contain two or three benzene nuclei and 50 to 80% by weight of chlorine and/or bromine attached to the benzene nuclei. Examples of polynuclear aromatic compounds from which the last-mentioned aromatic halogen compounds may be derived are diphenyl ether, diphenylene oxide, diphenyl, naphthalene and phenanthrene and also their alkyl substitution products.

It is surprising that the molding material according to this invention is particularly self-extinguishing because molding material based on high and low pressure polyethylene and polyisobutylene which contain the same amount of antimony trioxide and organic compounds containing aliphatically combined bromine are considerably less self-extinguishing.

The molding material may be prepared by mixing the propylene polymers in conventional manner with antimony trioxide and the bromine compounds, for example on rollers, kneaders or extruders. For the mixing, the bromine compounds may be added in the form of pastes or solutions, for example in acetone or chloroform, but also in the form of a concentrate in propylene polymers.

Molding material according to this invention is suitable for the production of molded articles by the usual processing methods for thermoplastics. For example sheets, boards, tubes, fibers, hollow articles, injection moldings and coatings may be prepared therewith. The molding materials are particularly suitable for use in electrical engineering and civil engineering.

Boards having a thickness of 3 mm. are pressed from the resultant molding material at 170° C. under a pressure of 200 atmospheres. Test strips having a width of 15 mm. are cut from the boards and exposed to the flame of a conventional laboratory burner. The test strips cease to burn immediately after they have been slowly withdrawn from the flame.

Test strips which have been prepared from 94 parts of polypropylene, 2 parts of antimony trioxide and 4 parts of hexabromodiphenyl ether or 2,4,6-tribromoaniline on the other hand continue to burn after withdrawal from the flame.

EXAMPLES 15 TO 20

Molding material based on polypropylene is made as described in Examples 1 to 14 but using other plastics; the following Table 2 gives the composition of the molding material, the columns giving the following information:

No. gives the number of the example,
P gives the number of parts of polypropylene,
B gives the number of parts of the bromine compound specified,
A gives the number of parts of antimony trioxide, and
O gives the number of parts of the other plastic.

TABLE 2

| No. | P | B | A | O |
|---|---|---|---|---|
| 15 | 85 | 6 1,2,5,6-tetrabromocyclooctane | 4 | 5 polyisobutylene (mol. wt. about 100,000). |
| 16 | 82 | do | 2 | 10 low pressure polyethylene (density 0.96, melt index 0.2). |
| 17 | 83 | 5 1,2,5,6,9,10-hexabromocyclododecane | 2 | 10 high pressure polyethylene (density 0.918, melt index 1.5). |
| 18 | 73 | do | 2 | 20 polystyrene. |
| 19 | 65 | 3 1,2,5,6,9,10-hexabromocyclododecane | 2 | 30 copolymer of 72% by weight of ethylene and 28% by wt. of vinyl acetate of melt index 15. |
| 20 | 74 | 4 1,2,5,6-tetrabromocyclooctane | 2 | 20 copolymer of 80% by wt. ethylene and 20% by wt. ethyl acrylate of melt index 5.4. |

The invention is further illustrated by the following examples in which parts are by weight.

EXAMPLES 1 to 14

Polypropylene having a molecular weight of about 450,000 and stabilized in conventional manner is homogeneously mixed with antimony trioxide, a compound containing aliphatically combined bromine and if desired other additives at 170° to 180° C. The amounts of the components are set out in the following Table 1 in which the columns give the following particulars:

No. gives the number of the example,
P gives the number of parts of polypropylene,
B gives the number of parts and the bromine compound used,
A gives the number of parts of antimony trioxide, and
O gives the number of parts of other additive.

Test strips made from this molding material as described in Examples 1 to 14 and tested under the conditions specified therein cease to burn immediately when they are slowly withdrawn from the flame of a laboratory burner.

EXAMPLE 21

93 parts of a copolymer prepared in conventional manner from 87 parts of propylene and 13 parts of ethylene, 5 parts of 1,2,5,6,9,10-hexabromocyclododecane and 2 parts of antimony trioxide are mixed on rollers at 180° C. Test strips are made from the resultant molding material in the manner described in Examples 1 to 14. The test strips cease to burn a few seconds after removal from the flame of a laboratory burner.

TABLE 1

| No. | P | B | A | O |
|---|---|---|---|---|
| 1 | 96 | 3 1,2,5,6,9,10-hexabromocyclododecane | 1 | nil. |
| 2 | 94 | 4 1,2,3,4-tetrabromocyclooctane | 2 | nil. |
| 3 | 94 | 4 1,2,5,6-tetrabromocyclooctane | 2 | nil. |
| 4 | 94 | 4 1-phenyl-1,2,4,5,8,9-hexabromodecane. | 2 | nil. |
| 5 | 94 | 4 1,2-dibromo-4-($\alpha,\beta$-dibromoethyl-cyclohexane). | 2 | nil. |
| 6 | 94 | 4 N,N',N''-tris ($\alpha,\beta$-dibromopropionyl)trimethylene triamine. | 2 | nil. |
| 7 | 94 | 4 Methylene-bis-(1,2-dibromo-1 methylpropionamide). | 2 | nil. |
| 8 | 90 | 6 1,2-dibromo-4-($\alpha,\beta$-dibromoethyl)-cyclohexane. | 2 | 2 carbon black. |
| 9 | 94 | 2 1,2,5,6,9,10-hexabromocyclododecane. | 2 | 2 chlorinated polyisobutylene (chlorine content 59.8% by weight). |
| 10 | 94 | 3 1,2,5,6-tetrabromocyclooctane | 2 | 1 chloroparaffin (chlorine content 70% by weight). |
| 11 | 87 | 9 2,3-dibromobutene-2-diol-1,4 | 4 | nil. |
| 12 | 94 | 2 1,2,5,6-tetrabromocyclooctane. | 2 | 2 octabromodiphenyl. |
| 13 | 94 | 2 1,2-dibromo-4-($\alpha,\beta$-dibromoethyl)-cyclohexane. | 2 | 2 halogenated diphenyl containing 61% by weight of bromine and 15% by weight of chlorine. |
| 14 | 93 | 3 1,2,5,6,9,10-hexabromocyclododecane. | 2 | 2 tribromotrichloro-diphenyl ether. |

We claim:
1. A self-extinguishing thermoplastic polymer composition comprising polymers of ethylenically unsaturated monomers composed of at least 70 mol percent propylene, said polymers having a molecular weight between 100,000 and 2,000,000 and containing (A) from 0.2 to 10% by weight of antimony trioxide and (B) 1 to 13% by weight of a brominated cycloalkane containing from 6 to 12 carbon atoms in the ring, containing 45 to 93% by weight of bromine, with reference to the weight of said brominated cycloalkane, and having a boiling point above 200° C. at atmospheric pressure, the combined weight of (A) and (B) amounting to 2 to 15% by weight of said composition.

2. A composition as claimed in claim 1 wherein (B) is 1,2,5,6,9,10-hexabromocyclododecane.

3. A composition as claimed in claim 1 wherein (B) is 1,2,3,4-tetrabromocyclooctane.

4. A composition as claimed in claim 1 wherein (B) is 1,2,5,6-tetrabromocyclooctane.

References Cited

UNITED STATES PATENTS

| | | | |
|---|---|---|---|
| 3,075,944 | 1/1963 | Wick et al. | 260—45.7 |
| 3,093,599 | 6/1963 | Mueller-Tamm et al. | 260—45.7 |
| 3,004,935 | 10/1961 | Raley et al. | 260—45.7 |
| 3,025,329 | 3/1962 | Gleason | 260—33.8 |

MORRIS LIEBMAN, *Primary Examiner.*

J. H. DERRINGTON, *Assistant Examiner.*

U.S. Cl. X.R.

260—45.75